United States Patent
Gebreselassie et al.

[11] Patent Number: 5,807,513
[45] Date of Patent: Sep. 15, 1998

[54] RECYCLING TRIM COMPONENTS

[75] Inventors: Girma Gebreselassie, Southfield; Harold G. Wolf, Jr., Gibraltar; Kurt C. Frisch, Grosse Ile; Daniel Klempner, West Bloomfield; Vahid Sendijarevic, Troy, all of Mich.

[73] Assignee: UT Automotive Dearborn, Inc., Dearborn, Mich.

[21] Appl. No.: 889,260

[22] Filed: Jul. 8, 1997

[51] Int. Cl.⁶ .......................... B29C 43/02; B29C 43/18
[52] U.S. Cl. .................... 264/37.3; 264/112; 264/119; 264/911
[58] Field of Search ................... 264/37.3, 119, 264/112, 911, 913

[56] References Cited

U.S. PATENT DOCUMENTS 3,888,806   6/1975   Kropscoti .................................. 264/128

OTHER PUBLICATIONS

K.C. Frisch, A. Sendijarevic, V. Sendijarevic, and D. Klempner; Utilization of Polymeric Isocyanate–based Binders in Recycling of Automotive Shredder Fluff; Apr. 27–28, 1995; 1–8; Proceedings of Cellular Polymers III, the 3rd International Conference, RAPRA Technology LTD, Coventry, England.

V. Sendijarevic, A. Sendijarevic, Z. Chen, H. Ullah, D. Kempner, and K.C. Frisch; Recycling of Automotive Shredder Residue Using Isocyanate–based Binders; Sep. 26–29, 1995; 400, 402–403; Proceedings of the SPI Polyurethanes.

V. Sendijarevic, A. Sendijarevic, Z. Chen, H. Ullah, D. Klempner, and K.C. Frisch; Utilization of Automotive Shredder Residue in Composite Applications; Nov. 6–9, 1995; 618, 622–625; Proceedings of the 11th Annual ESD Advanced Composites Conference and Exposition, Dearborn, Michigan.

*Primary Examiner*—Mary Lynn Theisen
*Attorney, Agent, or Firm*—Howard & Howard

[57] ABSTRACT

The invention relates to a method for the recycling of trim components of vehicles. The method comprises the steps of shredding manufacturing scrap and post-consumer scrap from vehicle headliners into small particles to produce fluff. This fluff is then combined with water and a binder reagent composed of either polyisocyanates, or polyisocyanates combined with various polyols. The solution of fluff, binder reagent and water are mixed, and then placed in a mold where the mixture is formed into a pre-preg sheet. Subsequently, the pre-preg sheet is subjected to compression molding at elevated temperatures to produce a finished composite trim panel. As part of the final compression molding step, a decorative coverstock can be included to produce a finished trim panel having a decorative cover.

16 Claims, 1 Drawing Sheet

RECYCLING TRIM COMPONENTS

BACKGROUND OF THE INVENTION

This invention generally relates to a method for recycling vehicle trim components and, more particularly, to a method capable of converting post-consumer scraps and manufacturing scraps from vehicle headliners into finished trim panels for use in vehicles.

Polyurethanes are the most widely used polymers in passenger vehicles. In the manufacture of polyurethane containing parts for vehicles a large volume of manufacturing scrap is generated. In addition, a large volume of post-consumer polyurethane scrap is generated when vehicles are dismantled. Due to increasing federal regulation and decreasing availability of landfill space, a major concern has been what to do with this scrap material. Of the available alternatives, recycling of the polyurethane scrap material remains the best long-term solution.

One problem in recycling the polyurethane found in vehicle headliners is that the headliners are generally composites of several materials including nylon, polyester fabrics, cellulose films, semi-rigid and flexible thermosetting polyurethane foams, and glass fibers. Separation of these individual components can be difficult and would not be cost effective. In addition, the post-consumer scrap material often includes contaminants such as dirt and automotive fluids.

Therefore, it is desirable to provide a rapid, efficient, cost effective and relatively simple system for recycling both manufacturing and post-consumer polyurethane scrap material. This invention allows for rapid, cost effective and efficient recycling of both manufacturing scrap and post-consumer scrap from vehicle headliners into a wide variety of panels for subsequent use in vehicles.

SUMMARY OF THE INVENTION

The method of the invention comprises the steps of shredding the scrap material into fluff, forming a binder reagent from polyisocyanates or a mixture of polyisocyanates and polyols, combining the fluff with the binder reagent and water to form a pre-preg mixture, the pre-preg mixture is then formed into pre-preg sheets, the pre-preg sheets are then compression molded at elevated temperatures into a variety of trim panels for use in a vehicle. The invention also permits a decorative coverstock to be applied to the panel as the panel is being molded thus eliminating a further manufacturing step.

The invention eliminates the difficulty of finding additional landfill space for scrap material from vehicle headliners. In addition, the invention provides a lower cost method for the production of a wide variety of trim panels for use in vehicles. Such uses include new headliners, interior trim panels, acoustical absorption panels, and liners for hood and trunk areas of a vehicle.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
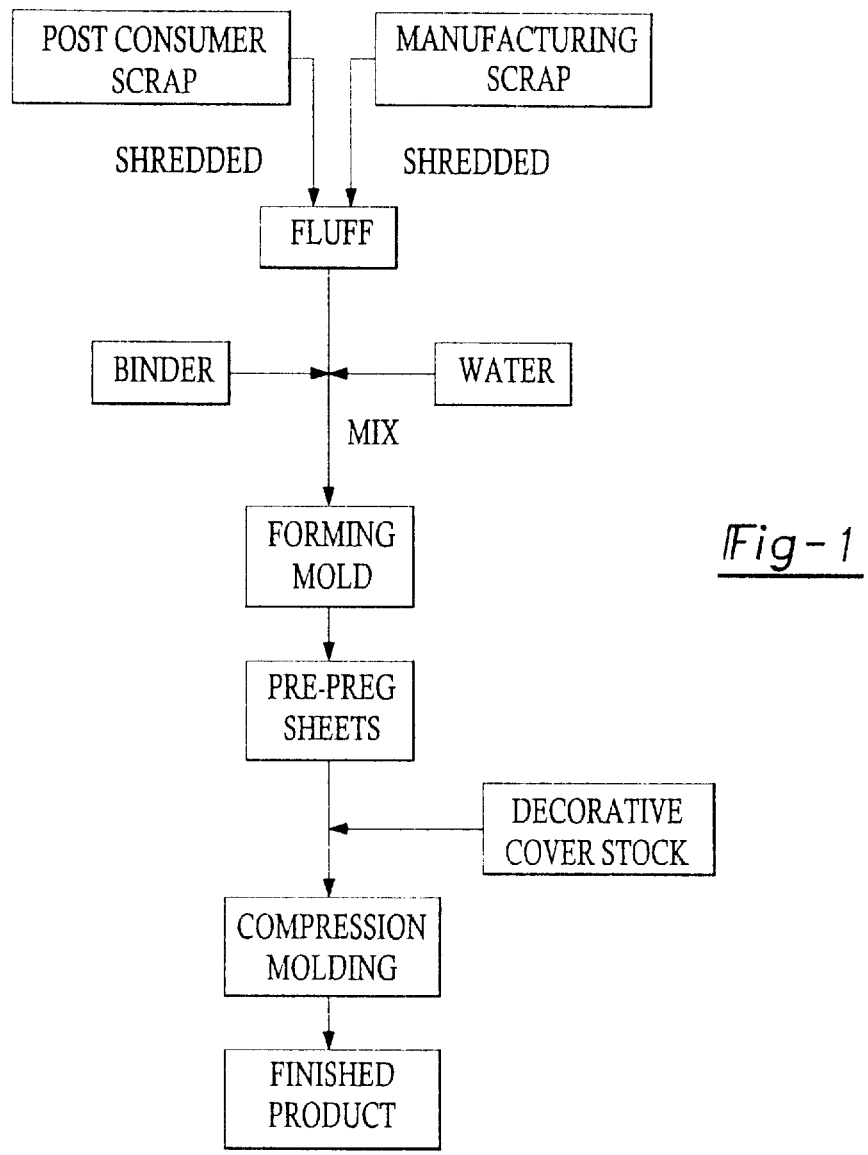
FIG. 1 is a flow chart depicting the steps of the method of this invention.

FIG. 1 is a flow chart which illustrates the basic steps in the method of this invention. In discussing the steps of this method, vehicle headliners are the disclosed source of the scrap material, although it will be understood by one skilled in the art that scrap material from other sources including interior trim panels and other sources of polyurethanes in the vehicle could be used as the starting scrap material. Two major sources of headliner scrap material are from either manufacturing scraps generated during the process of forming a vehicle headliner and post-consumer headliner scrap material generated during the dismantling of a vehicle. In the first step, the scrap material is shredded in a conventional shredding machine to a final particle diameter between 2 to 10 mm. This shredded scrap material is known as fluff.

The next step is the formation of the binder reagent. The essential parameters in selecting a binder reagent are that it be capable of remaining in the pre-polymerized state for a reasonable time to allow for handling of the pre-preg sheets. In addition, the binder reagent must be capable of curing under production compression molding cycles of 15 to 60 seconds at 100° C. to 250° C. with no post curing. Two binder reagents have been found to be effective in the invention.

The first binder reagent is a combination of polyisocyanates with polyols. Effective polyisocyanates include: poly (methylene)(polyphenyl)(polyisocyanate) (poly-MDI); toluene diisocyanate (TDI); or naphthylene diisocyanate (NDI). Poly-MDI, one of the most effective polyisocyanates, is a combination of diphenylmethane diisocyanate and polymethylene polyphenyl polyisocyanate in which the isocyanate functionality can vary between 2.1 to 3.0. But as will be understood by one skilled in the art, other polyisocyanates, isocyanate-terminated compounds or isocyanate quasi-prepolymers may also be effectively utilized in the method. Of the polyols which have been tested, numerous polyester and polyether polyols are effective in forming a suitable binder reagent. A particularly suitable polyol is Terate® 203 available from Hoechst-Celanese. Terate® 203 is particularly suitable because it is a low cost recycled polyester polyol produced from scrap polyethylene terephthalate post-consumer products like soda pop bottles and film. However, other polyols having an equivalent weight within the range of 100 to 200 are also effective in the methodology. The ratio of polyisocyanate to polyol is critical for producing a pre-preg sheet with acceptable molding and curing characteristics. Preferably, there is a greater amount of polyisocyanate than polyol. More preferably, the equivalent ratio is greater than 3 to 1. An equivalent weight ratio of five parts of polyisocyanate to one part of polyol has been found to be the most preferable ratio for producing a binder reagent with acceptable characteristics. When combined with water this polyisocyanate and polyol binder produces a polyurethane-urea binding reagent.

A second acceptable binder reagent can be produced in the absence of any polyol addition. In other words, any of the polyisocyanates disclosed above as the sole component of the binder reagent is capable of producing an acceptable composite. The most preferred polyisocyanate is poly-MDI. When combined with water this binder produces a polyurea.

The next step in the methodology is combining the fluff with the chosen binder reagent and water to form a pre-preg mixture. Water is added at an amount of 2 to 20 parts by weight of water per 100 parts by weight of fluff plus binder reagent. The most preferred amount of water is between 5 to 10 parts by weight of water per 100 parts by weight of fluff plus binder reagent. The ratio of fluff to binder reagent can be varied between the range of 80 to 97 parts by weight of fluff combined with 20 to 3 parts by weight of binder reagent, respectively. The most preferred range is 90 to 97 parts by weight of fluff combined with 10 to 3 parts by weight of binder reagent, respectively. When the binder reagent is composed solely of polyisocyanate, it reacts with free hydroxyl groups in the fluff material and with the water.

The next step in the methodology is to vigorously mix the binder reagent with the water and the fluff at room temperature. A secondary effect of the addition of water is to aid in dispersal of the binder reagent during this mixing period. Following vigorous mixing, the resulting pre-preg mixture is placed in a sheet mold and covered with a Teflon sheet. The pre-peg mixture undergoes compression of between 30 to 100 pounds per square inch at room temperature. Elevating the temperature during compression to between 40° to 55° C. results in a stronger pre-preg sheet. At this point in the method only a small amount of polymerization of the binder reagent has occurred. The pre-preg sheets have a shelf life of from several hours to several months if they are stored sealed with polyethylene film.

The final step in the method involves compression molding of the pre-preg sheets at elevated temperatures to produce a finished product such as a trim panel. Utilizing the binder reagents of this method, the pre-preg sheets can be compression molded into trim panels using a compression cycle of between 15 to 60 seconds at 100° to 220° C. with no post curing. Panels produced by compression molding of the pre-preg sheets exhibit high tensile strength, flexural strength, flexural modulus and compressive strength. It is during the compression molding that curing of the binder reagent takes place. One significant advantage of the method is that due to the fact that the binder reagent has not significantly polymerized in the pre-preg sheets a decorative coverstock, without additional adhesive, can be placed in the compression mold on one side of the pre-preg sheet and the compression mold cycling characteristics chosen to optimize binding of the decorative coverstock to the pre-preg sheet producing a trim panel with a decorative cover.

Figure 2:
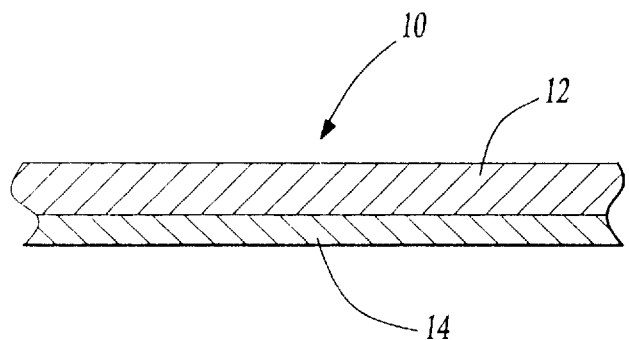
FIG. 2 is a cross sectional view of a trim panel produced by the method of the invention.

In FIG. 2 a cross sectional view of a trim panel prepared by the method of the invention is shown generally at 10. The trim panel 10 includes a substrate layer 12 which results from the compression molding of a pre-preg sheet (not shown). The trim panel 10 may also include a decorative coverstock layer 14 adhered to a side of the trim panel 10. The trim panels produced by the method of the invention have application as headliners, interior trim panels, liners for trunks and hoods, acoustical dampening panels and other vehicle panels.

EXAMPLE 1

In one example of a trim panel produced utilizing the method of the invention, 90 parts by weight of fluff material were combined with 2.1 parts by weight of Terate® 203 (Hoechst-Celanese), 7.9 parts by weight of poly-MDI and 8.3 parts by weight of water per 100 grams of fluff plus binder reagent. The material was vigorously mixed and then placed in a 2'×2' mold with a 5 mm frame and compressed at 38.6 pounds per square inch for ten minutes at room temperature. The resulting pre-preg sheet was then compression molded for 60 seconds at 150° C. and 86.8 pounds per square inch in a three-step mold with no post curing.

EXAMPLE 2

In this example, 95 parts by weight of fluff were combined with 1.1 parts by weight of Terate® 203, 3.9 parts by weight of poly-MDI and 8.3 parts by weight of water per 100 grams of fluff plus new binder reagent. The material was vigorously mixed, poured into a 2'×2' mold having a 5 mm frame, and compressed at 50 pounds per square inch for ten minutes at 50° C. The resulting pre-preg sheet then underwent compression molding for 60 seconds at 130° C. with no post-curing.

EXAMPLE 3

In this example, 97 parts by weight of fluff were combined with 0.6 parts by weight Terate® 203, 2.4 parts by weight poly-MDI, and 8.3 parts by weight of water per 100 grams of fluff plus binder reagent. The material was vigorously mixed at room temperature, poured into a 2'×2' mold having a 5 mm frame and molding was carried out at room temperature for ten minutes. The pre-peg sheet was then compression molded for 60 seconds at 130° C. with no post-curing. The compression molded composite had the following characteristics: a tensil strength of 3.9 Mega Pascals (MPa); a Young's modulus of 296 MPa; a flexural strength of 9.6 MPa; and a flexural modulus of 981 MPa.

EXAMPLE 4

In this example, 90 parts by weight of fluff were combined with 10 parts by weight poly-MDI and 8.3 parts by weight of water per 100 grams of fluff plus binder reagent. The material was vigorously mixed at room temperature and placed in a 2'×2' mold having a 5 mm frame and molded to form a pre-preg sheet. The pre-preg sheet was then subjected to compression molding for 60 seconds at 130° C. with no post-curing.

EXAMPLE 5

In this example, 95 parts by weight of fluff material were combined with 5 parts by weight poly-MDI and 8.3 parts by weight of water per 100 grams of fluff plus binder reagent. The resulting material was vigorously mixed at room temperature, placed in a 2'×2' mold having a 5 mm frame and molded into a pre-preg sheet. The pre-preg sheet was then subjected to compression molding for 60 seconds at 130° C. with no post-curing. The compression molded composite had the following characteristics: a tensil strength of 6.4 Mega Pascals (MPa); a Young's modulus of 551 MPa; a flexural strength of 26.7 MPa; and a flexural modulus of 4926 MPa.

EXAMPLE 6

In this example, 90 parts by weight of fluff material were combined with 2.1 parts by weight of Terate® 203, 7.9 parts by weight of poly-MDI, and 8.3 parts by weight of water per 100 grams of fluff plus binder reagent. The material was mixed vigorously at room temperature, placed into a 1.5'× 1.5' mold with a 5 mm frame at room temperature and compressed at 38.6 pounds per square inch for ten minutes. The resulting pre-preg sheet was then compression molded for 15 to 30 seconds at 200° to 220° C. and 1,300 to 2,200 pounds per square inch of compression.

The foregoing description is exemplary rather than limiting in nature. Variations and modifications to the disclosed methodology may become apparent to those skilled in the art and do come within the scope of this invention. Accordingly, the scope of legal protection afforded this invention can only be determined by studying the following claims.

We claim:

1. A method of forming a trim panel for a vehicle wherein said method comprises the steps of:

a) shredding scrap material to form fluff;

b) forming a binder reagent comprising a polyisocyanate and a polyol;

c) combining the fluff with the binder reagent and water to form a pre-preg mixture;

d) molding the pre-preg mixture into pre-preg sheets; and e) molding the pre-preg sheet to form the panel.

2. The method of claim 1, wherein the polyisocyanate is poly(methylene)(polyphenyl)(polyisocyanate), said method including the steps of combining the poly(methylene)(polyphenyl)(polyisocyanate) with a polyol to form the binder reagent.

3. The method of claim 1, wherein the polyol comprises a polyester polyol, said method comprising combining the polyester polyol with a polyisocyanate to form the binder reagent.

4. The method of claim 1, wherein the polyol comprises a polyether polyol, said method comprising combining the polyether polyol with a polyisocyanate to form the binder reagent.

5. The method of claim 1, wherein the amount of the binder reagent comprises three to twenty percent by weight of the combined weight of the fluff and the binder reagent, and wherein the method comprises combining the binder reagent with the fluff and water to form a pre-preg mixture.

6. The method of claim 1, wherein the amount of the binder reagent comprises three to ten percent by weight of the combined weight of the fluff and the binder reagent, and wherein the method comprises combining the binder reagent with the fluff and water to form a pre-preg mixture.

7. The method of claim 1, wherein the water comprises two to twenty percent by weight of the combined weight of the fluff and the binder reagent, said method comprising combining the water with the binder reagent and the fluff to form a pre-preg mixture.

8. The method of claim 1, wherein the water comprises five to ten percent by weight of the combined weight of the fluff and the binder reagent, said method comprising combining the water with the binder reagent and the fluff to form a pre-preg mixture.

9. The method of claim 1, wherein said method includes the further step of placing a sheet of a decorative coverstock adjacent to one side of the pre-preg sheet when molding the pre-preg sheet into the trim panel such that the decorative coverstock adheres to one side of the trim panel.

10. The method of claim 1, wherein the molding of the pre-preg sheet into the panel comprises compression molding the pre-preg sheet at elevated temperatures of between 100° C. to 220° C. for between 15 to 60 seconds to form the trim panel.

11. The method of claim 1 wherein the binder reagent comprises poly(methylene)(polyphenyl)(polyisocyanate), said method including the steps of combining the poly(methylene)(polyphenyl)(polyisocyanate) with the fluff and the water to form a pre-preg mixture.

12. A method of forming a trim panel for a vehicle wherein said method comprises the steps of:

a) shredding scrap material to form fluff having particle diameters from four to ten mm;

b) forming a binder reagent comprising a mixture of one part equivalent weight of polyol combined with five parts of equivalent weight of poly(methylene)(polyphenyl)(polyisocyanate);

c) combining the fluff with the binder reagent and water to form a pre-preg mixture comprising 90 to 97 parts fluff, 10 to 3 parts binder reagent, and 8 to 9 parts water per 100 parts of fluff plus binder reagent;

d) forming the pre-preg mixture into pre-preg sheets; and e) molding the pre-preg sheet to form the trim panel.

13. The method of claim 12, wherein the polyol comprises a polyester polyol, said method comprising combining the polyester polyol with a poly(methylene)(polyphenyl)(polyisocyanate) to form the binder reagent.

14. The method of claim 12, wherein the polyol comprises a polyether polyol, said method comprising combining the polyether polyol with a poly(methylene)(polyphenyl)(polyisocyanate) to form the binder reagent.

15. The method of claim 12, wherein said method includes the further step of placing a sheet of a decorative coverstock adjacent to one side of the pre-preg sheet then molding the pre-preg sheet such that the decorative coverstock adheres to one side of the trim panel.

16. The method of claim 12, wherein the molding of the pre-preg sheet comprises compression molding the pre-preg sheet to form the trim panel.

\* \* \* \* \*

UNITED STATES PATENT AND TRADEMARK OFFICE
CERTIFICATE OF CORRECTION

PATENT NO : 5,807,513
DATED : 09/15/98
INVENTOR(S) : Gebreselassie, et al.

It is certified that error appears in the above-identified patent and that said Letters Patent is hereby corrected as shown below:

On the title page,

[73] Assignee: UT Automotive Dearborn, Inc.
Dearborn, Mich.

University of Detroit Mercy
Detroit, Mich.

Signed and Sealed this

Eighteenth Day of May, 1999

*Attest:*

Q. TODD DICKINSON

*Attesting Officer*  *Acting Commissioner of Patents and Trademarks*